United States Patent [19]

Schrijver et al.

[11] Patent Number: 4,533,696
[45] Date of Patent: Aug. 6, 1985

[54] POLYMER POWDER COMPOSITIONS, PARTICULARLY POLYETHYLENE POWDER COMPOSITIONS AND OBJECTS TO BE MADE AND MADE THEREOF

[75] Inventors: Jan Schrijver, Roosteren; Arnold Vossebeld, Beek, both of Netherlands

[73] Assignee: Stamicarbon B.V., Geleen, Netherlands

[21] Appl. No.: 467,921

[22] Filed: Feb. 18, 1983

[30] Foreign Application Priority Data

Feb. 20, 1982 [NL] Netherlands ......................... 8200688
Apr. 24, 1982 [NL] Netherlands ......................... 8201711

[51] Int. Cl.$^3$ ............................ C08K 5/00; C08J 3/20; C08L 23/04
[52] U.S. Cl. .................................... 524/528; 264/45.7; 523/221; 525/240; 428/516; 428/318.4; 428/318.8
[58] Field of Search ......................... 525/240; 523/221; 524/528

[56] References Cited

U.S. PATENT DOCUMENTS

| | | | |
|---|---|---|---|
| 3,919,164 | 11/1975 | Hattori et al. | 525/240 |
| 3,929,939 | 12/1975 | Salyer et al. | 525/240 |
| 4,115,499 | 9/1978 | Salyer et al. | 264/122 |
| 4,238,537 | 12/1980 | Kerr | 428/35 |
| 4,307,133 | 12/1981 | Haselier | 427/195 |
| 4,336,351 | 6/1982 | Cinadr | 525/240 |
| 4,440,899 | 4/1984 | Peerlkamp | 524/528 |

FOREIGN PATENT DOCUMENTS

| | | |
|---|---|---|
| 983226 | 2/1976 | Canada . |
| 047039 | 3/1982 | European Pat. Off. . |
| 2058092 | 4/1981 | United Kingdom . |

OTHER PUBLICATIONS

Smarsh, "Powder Coating: Why-How-When," Journal of Paint Technology, vol. 44, No. 565, Feb. 1972, pp. 34–37.

Chem. Engineering, Jun. 11, 1962, Characteristics of Fine Particles, p. 207.

*Primary Examiner*—Carman J. Seccuro
*Attorney, Agent, or Firm*—Cushman, Darby & Cushman

[57] ABSTRACT

The invention relates to polymer powder compositions consisting of 1–99 wt. % of a polymer powder component A and 99–1 wt. % of a polymer powder component B, the average particle size of component A being smaller than that of component B, and to the preparation of hollow objects by rotational molding using these polymer powder compositions.

8 Claims, No Drawings

POLYMER POWDER COMPOSITIONS, PARTICULARLY POLYETHYLENE POWDER COMPOSITIONS AND OBJECTS TO BE MADE AND MADE THEREOF

The invention generally relates to improved polymer powder compositions. The improvements reside in employing a controlled average particle size of the powdered polymer components of the composition. The polymer powders are preferably polyolefin powders and more specifically polyethylene powders.

BACKGROUND OF THE INVENTION

Polymer powders have been used for manufacturing articles by rotational molding, a process that is well known in the art. The powder to be rotationally molded melts against the hot mold wall and forms a layer thereagainst which will eventually be the outer surface of the molded object. The thus formed surface of the molded object may consist of a single layer, but may also consist of a number of layers. Foam structures between or against either a layer or layers may be applied to improve the insulating properties or to limit the weight of the objects. The surface layer and the foam laying thereagainst must adhere to each other. Now, this adhesion leaves much to be desired in the processing of polyethylene. The same is true with polypropylene. This is an acute problem in producing surf-boards or wind surf boards, made for the most part, by the rotational molding process wherein a wall of polyethylene, particularly of polyethylene having a high or medium density of at least 0.930 g/ml forms the outer surface, i.e. envelopes, the core of such boards. Polyethylene having a lower density may also be processed for this purpose. Generally speaking polyurethane foam forms the core of such boards.

In use however, the polymer wall may be damaged and water may penetrate into the foam. Damage, will occur less rapidly when there is good adhesion between the wall and foam. In such circumstances accompanied by outer wall damage, water can then penetrate only into the foam in an area immediately under the damaged portion of the wall. If the wall-core adhesion is poor, then water may spread between the wall and foam and thus be absorbed throughout the object. Good adhesion is thus highly desirable for in particular wind surf boards as well as for other objects built up from similar components. There is, therefore, a widespread need for polymer compositions to satisfy this objective.

There are other uses of hollow article made by rotational molding. So without filling the hollow article with a foam the article may be used as e.g. a container for organic or other liquids. It may be required that the inner layer has mechanical, physical or other properties that differ from the properties of the outer layer. Such a condition may also be imposed when the requirements for the wall of the hollow article cannot be met by one material. One can fulfill such conditions by making the hollow article from two or more layers constituting the wall of the hollow article. It has been disclosed to produce such articles in a two shot rotational molding process, molding first an outer layer, cooling the rotational mold, adding into the mold a second charge of polymer powder and molding an inner layer. The first and second charge can consist of different materials, but they can consist also of the same or closely related materials having different properties. So in order to make surf-boards one can make in a first shot an outer layer of stabilized polyethylene that releases easily from the mold and has good wheathering properties, whereas in a second shot an inner layer of the same or another grade of polyethylene, that has not been stabilized is produced. Due to the lack of stabilization said inner layer becomes somewhat oxidized during rotational molding and said oxidized polyethylene adheres well to a core consisting of polyurethanfoam. Such two shot processes are laborious and costly.

The compositions described in U.S. Pat. No. 4,307,133 for coating metal pipes consisting of a polyolefin powder composition having from 0.5% to 80% by weight of unstabilized polyethylene powder and from 20% to 99.5% by weight of a stabilized polyolefin powder are not suitable for producing hollow articles that are to be filled with e.g. a polyurethan foam. Such compositions adhere strongly to the metal object while the exterior of the coating exhibits some resistance to oxidation and other weathering influences. When such compositions are rotationally molded and filled subsequently with e.g. polyurethan foam they adhere strongly to the mold and mold release is very difficult or not possible at all whereas the adherance to the foamed core is unsatisfactory.

Improved adhesion of polyethylene to metal substrates by mixing the polyethylene with oxidized polyethylene is proposed in U.S. Pat. No. 3,639,189. The oxidized polyethylene is obtained by heating polyethylene in an oxygen atmosphere at temperatures that may range from 90° C. to the crystalline melting point of the polyethylene until the desired degree of oxidation has been reached. The un-oxidized polyethylene is then mixed in the melt with the oxidized polyethylene and granulated. Subsequently the granulate is used as a starting material applying polymer layers to metal substrates. This proposal suffers from several drawbacks. The oxidation of polyethylene is laborious and significantly increases the cost of the composition used as starting material. In applications as for instance, manufacturing windsurf boards by rotational molding such a composition is not suitable, because the oxidized polyethylene reduces the resistance of the polyethylene composition against atmospheric influences and degradation. The decrease of the wheathering resistance is highly undesirable for an outer wall, such as the outer skin of a windsurf board, which is exposed to atmospheric influences in an outdoor environment.

Now, it is true that this disadvantage might be combated by incorporating more stabilizing agents in the polyethylene composition. However, incorporating more such agents is just not practical since the product costs will significantly and undesirably escalate. Using compositions containing oxidized polyethylene to produce objects in a die or mold by, for instance rotational molding, has the additional disadvantage that such compositions also adhere to the mold. If non-oxidized polyethylene is used, then release agents are a necessity if the polyethylene enveloped article is to be released from the mold. Besides, despite the use of release agents difficulties will still occur in attempting to remove an oxidized-polyethylene-coated-article from a mold.

Further attempts to solve these drawbacks include polyolefin compositions of stabilized and unstabilized polyethylenes wherein the focus is on controlling the crystalline melting points of the stabilized and unstabilized components. Such compositions do provide some improved adhesion to a substrate and improved release from the wall of the mold. However, imperfections are not infrequent. For instance, the adhesion of the polyolefin wall to a foamed core is sometimes unsatisfactory and the release from the mold is often very difficult. It has now been found that the results are dependent upon the processing conditions. It is supposed that the degree of separation of the stabilized and of the unstabilized polyolefin depends on the method and rate of heating of the mold and on other processing conditions.

SUMMARY OF THE INVENTION

It has now been found that according to the present invention articles can be rotationally molded, whose outer and inner surface show different properties by employing a polymer powder composition consisting of about 1% to about 99% by weight of a polymer powder, component A and about 99% to about 1% by weight of a polymer powder, component B, wherein the average particle size of component A is smaller than the average particle size of the component B.

DETAILED DESCRIPTION OF THE INVENTION

The compositions according to the invention are particularly suitable for rotational molding, and the invention will also be elucidated with reference thereto, but the uses are not restricted to rotational molding.

In rotational molding a quantity of a thermoplastic material is introduced in a mold that can rotate and/or oscillate about one or more axes. The mold is then heated to above the melting point of the plastic, and slowly rotated and/or oscillated to ensure a uniform distribution of the powder over the mold surface. It appeared that the present compositions consisting of a fine component A and a coarser component B separate on rotational molding. The outer surface layer of the molded wall is formed essentially from the fine component A, whereas the inner surface layer of the molded wall is formed essentially from the coarser component B. Analysis of a cross section of the wall shows that from outside to inside there is a gradual change from essentially component A to essentially component B.

As elucidated hereinafter, the essence of the invention must be understood to consist in the difference in particle size of the two components so that separation of the components will occur when the present compositions are heated in a mold beyond the melting point of each component.

It should be understood that the present invention contemplates in a broad sense polyolefinic powders having the aforementioned critical features. Therefore, the use of polyethylene in the examples is not intended to restrict the present invention. For instance by using a finer powdered stabilized component and a coarser powdered component, the objects of the present invention can also be obtained with other polymers.

Therefore it should be clear that the present invention also relates to polymer compositions other than polyethylene. For reasons of simplicity, however, reference is made hereinafter only to polyolefin or polyethylene compositions.

The polyolefin compositions according to the invention are preferably polyethylene compositions. In addition, polyethylene compositions with polypropylene or polypropylene compositions are eligible. Commercially, other than the polyolefins, only the polyisobutenes are of importance. Often these elastomers are marketed in a modified form and have their principal uses in other fields. Furthermore, limited quantities of polybutene and poly-4-methylpentene-1 are marketed. These polymers also come within the scope of the invention. In addition to homopolymers, many copolymers are produced and may also be incorporated in compositions according to the present invention. It will be understood that the aims of the invention can be realized with a finer component A and a coarser component B consisting of any other thermoplastic resin. One of the components may even be a thermosetting resin.

When the finer component A and the coarser component B are selected from two different polymers it is advantageous when component A has the lowest melting point. When the melting points of component A and component B differ only slightly, say less than 5° centigrade, said condition becomes less serious, and one may succeed in realizing the effect of the invention when component A has a slightly higher melting point than component B. However it goes without saying that component A has preferably a lower melting point than component B. Different polymers will have different melting points. However closely related polymers e.g. copolymers showing only different ratio's of the same comonomers have usually different melting points. Ethylene homopolymers have generally higher melting points than ethylene copolymers, the melting point being the lower the higher the amount of comonomer in the polymer. The invention will now be further elucidated for polyethylene, but as the aforementioned shows, it will be clear that the invention is not limited thereto.

Polyethylene is generally marketed in the form of pellets. For uses like rotational molding, however, it must be in granular form. Generally the particle size of rotational molding powders is smaller than 2 mm and preferably smaller than 1 mm. More specifically, the average particle size ranges between about 0.5 and about 1 mm, though It may even be somewhat smaller. Commercially, particle sizes smaller than about 0.3 mm are generally not used. Rotational molding powders are mostly obtained by grinding pellets. It is true that manufacture of polyethylene by a slurry process or gas phase process, gives granular ethylene polymers, but the morphological and rheological properties of such powders are generally poor. Therefore such powders are pelletized and subsequently ground.

Preferably the present composition consists of a finer component A having an average particle size of 0.050 mm to 0.250 mm such that the average particle size of the finer component A is at least 0.050 mm smaller than that of the coarser component B. This aspect is essential.

The average particle size is determined by sieve analysis in a manner known per se. The results of the sieve analysis is represented graphically in a Rosin-Rammler diagram, as described in, for example DIN 66145. The point on the line of the Rosin-Rammler curve corresponding with a sieve residue of 36.8% gives the average particle size. The slope of the line is a measure for the width of the particle size distribution. The particle size distribution is narrower as the slope increases. It is characterized by the factor of uniformity n. Thus, as the uniformity factor increases, the more uniform the powder and the narrower the particle size distribution.

According to the present invention, the particle size distribution is of interest. With a wide particle size distribution in the polyolefin composition and a limited difference in particle size between the components A and B, the powder fractions at the bottom of the particle size distribution of the coarser component B may penetrate into the particle size distribution field of the finer component A.

Though not to be regarded as a binding statement, it is posited that when the present compositions are employed in rotational molding the smallest particles are the most rapidly heated particles and therefore are the first to melt since their mass content per unit surface area is far smaller than the mass/area ratio for the coarser particles. The transfer of heat is proportional to the surface, but the amount of melting heat is proportional to the mass. On this basis it might indeed be assumed that the smallest particles are the first to melt. It was extremely surprising, however, that in this process a very distinct separation of the coarse and fine particles was obtained. As they are the first to melt, the fine particles will form on outer layer, i.e. surface-wall against the interior surface of the mold wall. Only after that the coarser particles begin to melt and will then form the inside part or layer of the wall.

The processing of polyethylene, particularly of high-density polyethylene, takes place at temperatures above 140° C., and for this reason the granulate is stabilized against thermal decomposition. The polyethylene is also stabilized both against oxidative attack and the influence of light, particularly of UV, so that objects made of the polyethylene will have good resistance against atmospheric influences. Stabilization against oxidative modification is also required to prevent rapid oxidative attack when the polymer contacts oxygen, for instance atmospheric oxygen, during the processing. After the polymerization of ethylene, small quantities of thermal and oxidative modification stabilizing agents are often added to protect the polymer while it is being further worked up. Then prior to pelletization, further quantities of stabilizing agents are added. If this last-mentioned addition is not made, a non-stabilized or hardly stabilized polyethylene will be obtained containing in any case less than 0.01% wt, more specifically less than 0.005% wt, stabilizing agents.

If such a non-stabilized or hardly stabilized polyethylene is used for making objects in a die or in a mold, for instance by rotational molding, oxidative conversions will occur at those places where, at elevated temperatures, the polyethylene comes into contact with air. The mold mostly contains air, and during the heating of the mold a noticeable oxidative conversion of the polyethylene will then take place, such as oxidation, with or without chain breakage, cross-linking, and the like. Thus the adhesive properties of the polyethylene will improve.

As a result of the presence of stabilizing agents, there will be no or hardly any perceptible oxidation of the stabilized polyethylene under the processing conditions.

It is supposed that when a stabilized and an unstabilized polyethylene is used as finer component A with respect to coarser component B, and in the rotationally molded hollow form polyurethane is foamed, the adherance of the inner surface of the polyethylene form to the polyurethane foam is due to oxidized groups in the polyethylene. Such oxidized groups are capable of being formed during the processing in the non-stabilized or hardly stabilized component. This can easily be demonstrated through infrared analysis. For instance, an infrared analysis can be made to establish that each component can form a separate layer under the intended processing conditions. An infrared spectrum of the non-stabilized or hardly stabilized polyethylene will show a clearly perceptible band at 1650–1800 cm$^{-1}$ which is indicative of C═O bonds. With the stabilized polyethylene such a band is not or hardly perceptible.

An infra-red study of a layer made by rotational molding of a composition according to the invention revealed that the presence of C═O groups on the inside of the wall was quite distinct. This is apparent from the occurrence of a band at 1650–1800 cm$^{-1}$, whereas the outside of the wall showed no band at 1650–1800 cm$^{-1}$. From this it may be concluded that the inside of the wall is oxidized, whereas on the outside of the wall the oxidation can be referred to as insignificant at most. Some oxidation of the outer surface cannot always be ruled out. In some cases a very weak band at 1650–1800 cm$^{-1}$ will then be observed. Though some oxidation is permissible, it should be limited as far as possible.

If polyurethane is foamed into a hollow form made by rotationally molding a non-stabilized or hardly stabilized polyethylene, the adhesion turns out to be so strong that breaking will occur in the foam and not on the interface when efforts are made to pull the polyethylene loose from the polyurethane foam. A non-stabilized or hardly stabilized polyethylene does have good adhesion to the polyurethane foam or to other substrates. However a non-stabilized layer will have insufficient resistance to cope with atmospheric influences, and objects made thereof will weather in an unacceptably short period of time. Such a layer will also undesirably adhere to the mold wall. It has been found that, despite the use of release agents, it is difficult to release such a layer from the mold.

Now, good adhesion to the substrate occurs, while the molded object having an outer surface consisting essentially of the stabilized component is easily released from the mold. The outer surface of the wall is also very resistant against weathering.

In the rotational molding of a composition according to the present invention wherein the component A is stabilized and component B is hardly stabilized the oxidation must be such as to provide proper adhesion to the substrate, but also the oxidation must not be such as to present difficulties in mold release and/or problems in the stabilization. This must be considered in determining the quantity of unstabilized component. Less than 1% wt of the hardly or unstabilized component will barely produce any effect and more than 80% wt is also undesirable. Preferably said compositions contain about 10% to about 30% by wt unstabilized polyolefin and in particular about 10% to about 30% by wt of a non-stabilized or hardly stabilized polyethylene. The stabilized component of these compositions, is preferably polyethylene which may, if desired, be a copolymer, containing minor amounts of at least one other olefin. Compositions consisting of a stabilized and an unstabilized component have been and are discussed here by way of example. It will be understood that there are many other embodiments within the scope of the invention.

During the processing the above compositions consisting of a fine component A that has been stabilized and a coarse component B that is not stabilized by, for instance, rotational molding, there may be some slight migration of stabilizing agents. At ambient temperature the migration will continue, albeit very slowly, so that in course of time a homogenous distribution may be brought about. The polyethylene layer is then uniformly stabilized. The total quantity of stabilizing agents present in the polyethylene composition must indeed suffice to preserve a sufficiently stabilized product. The above points must be taken into consideration in the preparation of the components of the present composition.

Stabilized polyethylene generally contains at least 0.01% wt stabilizing agents and mostly at least 0.025% wt in all. The quantities of stabilizing agents incorporated in polyethylene are determined by the desired stability. Generally, more than one stabilizing agent is added to guard against different influences. Also many combinations of stabilizing agents are accompanied by synergistic effects.

According to the present invention each component can be also composed of two or more polyolefins. For instance, in polyethylene compositions both low and high-density polyethylene may be used as starter material, however, preference is given to polyethylene having a density of at least 0.930.

The polymer components in the present compositions need not necessarily differ from each other only in particle size. Different grades of the same polymer can be used as well, for instance polyethylene grades having different melt indices, but different kinds can be used also, for instance an ethylene homopolymer and an ethylene copolymer, low and high-density polyethylene, polyethylene and polypropylene, and the like. Such different kinds of polymers generally also have different melting points. In rotational molding the kind of polymer having the lowest melting point will generally be the first to melt. Hence, if for the fine and for the coarse component polymers are used having different melting points, the fine component should preferably consist of the polymer having the lowest melting point. In this regard, patent application Ser. No. 298,253, now U.S. Pat. No. 4,440,899 the disclosure of which is incorporated herein by reference, describes compositions consisting of a non-stabilized or hardly stabilized component having a crystalline melting point which is at least 1° C. higher than that of the other component, which is stabilized. In the present compositions a polymer having a crystalline melting point which is at least 1° C. higher than that of the fine component could be, if desired, employed as the coarse component.

The compositions according to the invention and particularly the components which they are composed of may contain the usual additives such as colorants, fillers, and the like which are well known in the art.

As explained before the present invention has been described with particular reference to the use of a composition of a fine stabilized and a coarse unstabilized component for the manufacture of hollow shapes by rotational molding. However, it will be understood that the invention and this disclosure encompass other compositions that consist of components of differing particle sizes. So one can select as a fine component a polymer that has good wheathering properties but is not impervious to organic liquids as hydrocarbons, and as a coarse component a polymer that is impervious to organic liquids but whose weathering properties can be rather poor. Containers for organic liquids can be made from such compositions. It is also possible to select one component from polymers that are impervious to one group of liquids and the other component from polymers that are impervious to another group of liquids such as non-polar organic liquids on the one side and water and polar liquids on the other side.

The relative quantities of the components must enable to realize the desired properties. Less than 1% by weight of one of the components does generally hardly show any effect of said minor component. With amounts slightly over 1% the effect is generally rather limited. So the compositions contain preferably at least 10% and more preferably at least 25% by weight of the minor component.

The invention is further elucidated by the following non-limiting examples:

EXAMPLE I

Polyethylene powder coloured red by kneading in 0.5 wt % iron oxide red 130 B was mixed with polyethylene powder coloured yellow by kneading in 0.5.% wt cadmium yellow 1080.

The red polyethylene has a melt index (ASTM D-1238 condition E) of 4.5 and a density of 0.941. 20% wt of the powder had a particle size of 0.3–0.4 mm, 70% of the powder had a particle size of 0.4–0.5 mm and 10% of the powder had a particle size is larger than 0.5 mm.

The yellow polyethylene was of the same grade as the red polyethylene. The particle size distribution of the powder was: 10% wt smaller than 0.125 mm, 30% wt from 0.125 to 0.175 mm and 60% wt. from 0.175 to 0.25 mm.

Mixtures were then prepared having 70 parts by weight red and 30 parts by weight yellow polyethylene and having 30 parts by weight red and 70 parts by weight yellow polyethylene.

By rotational molding a hollow object was then made from these mixtures. The oven temperature was set at 275° C. The period of rotation was 16 minutes, the wall thickness of the mold was 3 mm.

The wall formed was yellow on the outside with only a few hardly perceptible red spots. The inside was red with only a few hardly perceptible yellow spots. In cutting the wall and observing the cross sections it was found that the separation was so good that the differences in the composition of the two mixtures could not be seen on the exterior surfaces. The cross sections did show that one composition contains far more red polyethylene than the other.

The two components colored with two contrasting colors clearly demonstrated the separation of the components and the formation of the desired layers during the rotational molding process.

EXAMPLE II

Polyethylene powder coloured red by kneading in 0.5 wt % iron oxide red 130 B was mixed with polyethylene powder coloured yellow by kneading in 0.5 wt.% cadmium yellow 1080.

The red polyethylene had a melt index (ASTM D-1238 condition E) of 4.5 and a density of 0.941. It contained only 0.004 wt.% octadecyl-3-(3.5-di-tert.butyl-4-hydroxyphenyl)propionate. 20 wt.% of the powder had a particle size of 0.3–0.4 mm, 70% of the powder had a particle size of 0.4–0.5 mm and 10% of the powder had a particle size is larger than 0.5 mm.

The yellow polyethylene was of the same grade as the red polyethylene, but was stabilized with 0.25 wt.% 2-hydroxy-4-n-octoxy-benzophenone and 0.05 wt.% octadecyl-3-(3.5-di-tert.butyl-4-hydroxyphenyl)propionate. The particle size of the powder was: 10 wt.% smaller than 0.125 mm, 30 wt.% from 0.125 to 0.175 mm and 60 wt.% from 0.175 to 0.25 mm.

Mixtures were prepared with 70 parts by weight of red and 30 parts by weight of yellow polyethylene and with 30 parts by weight of red and 70 parts by weight of yellow polyethylene.

By rotational molding a hollow object was made from these mixtures. The oven temperature was set at 275° C. The period of rotation was 16 minutes, and the wall thickness of the mold was 3 millimeters. Release from the mold was easy.

Next, polyurethane was foamed within the hollow object. Subsequently, cross sections having a surface area of 5×6 cm were cut from the object so that blocks of polyurethane foam were obtained which were covered with a polyethylene skin on two sides. These blocks were subjected to a tensile test with a drawing speed of 1 cm/min.

The adhesive force of the polyethylene to the polyurethane could not be established, because breaking occurs in the polyurethane foam, but was at least 0.260 N/mm$^2$.

COMPARATIVE EXAMPLE A

Example I was repeated, but now both the red polyethylene and the yellow polyethylene contains only 0.004 wt.% octadecyl-3-(3.5-di-tert.butyl-4-hydroxyphenyl)propionate.

Release from the mold was difficult.

The adhesive force of the polyethylene to the polyurethane could not be established because breaking occurs in the polyurethane foam, but was at least 0.260 N/mm$^2$.

COMPARATIVE EXAMPLE B

Example II was repeated, but now the particle size and the particle size distribution of the red polyethylene were the same as those of the yellow polyethylene.

Upon cutting of the wall and examination of the cross sections it was found that no separation of the red and the yellow polyethylene had taken place.

Release from the mold was difficult.

The determination of the adhesive force presented problems because the polyethylene skin had already started to come off when the polyurethane blocks were fixed in the clamps of the tensile strength tester. Upon drawing, the polyethylene had already come loose from the foam before a measurable value could be measured. The plane of partition was clean, without any polyurethane foam adhering to the polyethylene.

COMPARATIVE EXAMPLE C

Example II was repeated, of the yellow, stabilized polyethylene 5 wt.% had a powdered particle size <250 μm, 20 wt.% had a particle size of 250-300 μm, 45 wt.% had a particle size of 300-400 μm, 25 wt.% had a particle size of 400-450 μm and 5 wt.% had a particle size of 450-500 μm.

Release from the mold was less easy than in Example II.

The adhesive force of the polyethylene to the polyurethane foam is 0.10 N/mm$^2$.

What is claimed is:

1. An improved polymer composition for rotational molding having about 1 wt.-% to about 99 wt.-% of a polyolefin polymer powder component A and about 99 wt.-% to about 1 wt.-% of polyolefin powder component B, component A having an average particle size of at least about 0.050 mm up to at most about 0.250 mm and component B having an average particle size of at most 1 mm, the improvement consisting essentially in that the average particle size of said component A is at least about 0.050 mm smaller than the average particle size of component B, component B containing at most 0.01 wt.-% stabilizer and component A containing at least 0.025 wt.-% stabilizer, said composition during rotational molding forming a stabilized outer layer and a non-stabilized inner layer.

2. A polymer composition according to claim 1 wherein at least one of said component A and said component B is composed of polyethylene.

3. A polymer composition according to claim 1 wherein said polymer composition contains at least 10% by weight of component A and at least 10% by weight of component B.

4. A polymer composition according to claim 1, wherein said polymer composition contains at least 25% by weight of component A and at least 25% by weight of component B.

5. The polymer composition according to claim 1 wherein said component A and said component B are selected from the class of polypropylene, polybutene, and poly-4-methylpentene-1 and polyisobutene.

6. A polymer composition according to claim 2 wherein said polyethylene is an ethylene homopolymer.

7. A polymer according to claim 5 wherein at least one of said component A or said component B is composed of polyisobutene.

8. A polymer composition according to claim 1 wherein said composition contains about 10 wt.% to about 30 wt.% of said component B.

* * * * *